United States Patent
Ceglia et al.

(10) Patent No.: US 10,281,316 B2
(45) Date of Patent: May 7, 2019

(54) FLOW MEASURING DEVICE, AS WELL AS USE OF SUCH DEVICE AND METHOD FOR ASCERTAINING FLOW VELOCITY

(71) Applicant: Endress + Hauser Flowtec AG, Reinach (CH)

(72) Inventors: Paul Ceglia, Bottmingen (CH); Achim Wiest, Weil am Rhein (DE); Oliver Brumberg, Rheinfelden (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 377 days.

(21) Appl. No.: 14/432,221

(22) PCT Filed: Sep. 19, 2013

(86) PCT No.: PCT/EP2013/069436
§ 371 (c)(1),
(2) Date: Jul. 20, 2015

(87) PCT Pub. No.: WO2014/060175
PCT Pub. Date: Apr. 24, 2014

(65) Prior Publication Data
US 2015/0377691 A1    Dec. 31, 2015

(30) Foreign Application Priority Data
Sep. 28, 2012   (DE) .................. 10 2012 109 237

(51) Int. Cl.
*G01F 25/00* (2006.01)
*G01F 1/66* (2006.01)
(Continued)

(52) U.S. Cl.
CPC ............ *G01F 25/0053* (2013.01); *G01F 1/66* (2013.01); *G01F 1/692* (2013.01); *G01F 1/7082* (2013.01); *G01F 7/00* (2013.01)

(58) Field of Classification Search
CPC .......... G01F 25/0053; G01F 1/66; G01F 1/661
See application file for complete search history.

(56) References Cited

U.S. PATENT DOCUMENTS

| 4,484,478 A | 11/1984 | Harkonen |
| 4,598,593 A | 7/1986 | Sheen |

(Continued)

FOREIGN PATENT DOCUMENTS

| DE | 4237907 A1 | 5/1994 |
| DE | 4336370 C1 | 2/1995 |

(Continued)

OTHER PUBLICATIONS

Machine translation of DE 4237907 A1 (published May 19, 1994).*
(Continued)

*Primary Examiner* — Leslie J Evanisko
*Assistant Examiner* — Quang X Nguyen
(74) *Attorney, Agent, or Firm* — Bacon & Thomas, PLLC (57) ABSTRACT

A flow measuring device for ascertaining a corrected measured value of a flow velocity and/or a corrected mass flow of a medium, especially a gas, in a measuring tube, including: an apparatus for ascertaining a first measured value of flow velocity and/or mass flow of the medium by thermal, mass flow measurement; an apparatus for ascertaining velocity of sound and/or frequency dependent damping of an acoustic signal, especially an ultrasonic signal, in the medium and/or an apparatus for ascertaining an optical, wavelength dependent absorption of an optical and/or excited fluorescence of the medium, and an evaluation unit for correcting the ascertained first measured value of mass flow or flow velocity based on the ascertained sound velocity values and/or the frequency dependent, ascertained damping values of the acoustic signal and/or the ascertained absorption values of the optical signal and/or the florescence (Continued)

values of the medium, and method for ascertaining a corrected measured value of flow velocity and/or mass flow, and use of the device and method.

27 Claims, 3 Drawing Sheets (51) Int. Cl.
G01F 1/692 (2006.01)
G01F 1/708 (2006.01)
G01F 7/00 (2006.01)

(56) References Cited

U.S. PATENT DOCUMENTS

| | | | |
|---|---|---|---|
| 5,203,211 A * | 4/1993 | Jung | G01F 15/08 73/200 |
| 5,533,408 A | 7/1996 | Oldenziel | |
| 5,600,073 A * | 2/1997 | Hill | G01F 1/666 73/861.04 |
| 5,650,572 A | 7/1997 | Vontz | |
| 8,104,359 B2 | 1/2012 | Wiest | |
| 8,667,839 B2 | 3/2014 | Kimura | |
| 2007/0206179 A1 | 9/2007 | Wang | |
| 2010/0269821 A1 | 10/2010 | Larsson | |
| 2011/0153225 A1 | 6/2011 | Mangal | |
| 2011/0317390 A1* | 12/2011 | Moser | G01D 11/245 361/807 |
| 2012/0271569 A1* | 10/2012 | Wilson | G01F 15/022 702/48 |
| 2013/0283895 A1* | 10/2013 | Etherington et al. | G01F 1/692 73/114.34 |

FOREIGN PATENT DOCUMENTS

| | | |
|---|---|---|
| DE | 29803911 U1 | 5/1999 |
| DE | 20217612 U1 | 5/2003 |
| DE | 10200504790 A1 | 4/2007 |
| DE | 102006030964 A1 | 1/2008 |
| DE | 102007062908 A1 | 6/2009 |
| EP | 0686255 B1 | 12/1995 |
| WO | 2012111368 A1 | 8/2012 |

OTHER PUBLICATIONS

Martin Dingman, Clamp-on Ultrasonic Flowmeters, published 2011.*
PTC Thermistor NPL (Published Feb. 1, 2002).*
German Search Report, German PTO, Munich, dated Mar. 20, 2013.
International Search Report, EPO, The Netherlands, dated Jan. 21, 2014.
English Translation of the International Preliminary Report on Patentability, WIPO, Geneva, CH, dated Apr. 9, 2015.

* cited by examiner

FLOW MEASURING DEVICE, AS WELL AS USE OF SUCH DEVICE AND METHOD FOR ASCERTAINING FLOW VELOCITY

TECHNICAL FIELD

The invention relates to a flow measuring device as well as to a method.

BACKGROUND DISCUSSION

Known are flow measuring devices, which ascertain the flow velocity of a medium using the travel-time difference method. The use of such flow measuring devices is limited essentially to liquids or gases with low flow velocities. In the case of higher velocities, especially in the case of gases, dispersion of the ultrasonic signal can occur, so that the signal no longer completely strikes the receiver provided therefor. In given cases, the signal can completely miss the receiver. In either case, significant signal loss can be experienced.

Also known are flow measuring devices, which determine the flow velocity of a medium using thermal, mass flow measurement. This method can be applied especially for gases with high flow velocities. In the case of lower flow velocities, this measuring method is, however, often too inaccurate. Moreover, this type of measuring can only be applied for gases with known thermal conductivity coefficients. In the case of combustion exhaust gases from plants, for example, oil fields and the like, the flow velocity often cannot be exactly determined, since the composition of such gases can change.

SUMMARY OF THE INVENTION

Starting from the aforementioned state of the art, it is an object of the invention to provide a flow measuring device and a method for ascertaining a corrected mass flow and/or flow velocity of a medium.

According to the invention, a flow measuring device for ascertaining a corrected measured value of flow velocity and/or a corrected mass flow of a medium, especially a gas, in a measuring tube, includes:
a) an apparatus for ascertaining a first measured value of flow velocity and/or of mass flow of the medium by thermal, mass flow measurement;
b) an apparatus for ascertaining velocity of sound and/or frequency dependent damping of an acoustic signal, especially an ultrasonic signal, in the medium and/or an apparatus for ascertaining an optical, wavelength dependent absorption and/or excited fluorescence of the medium; and
c) an evaluation unit for correcting the ascertained first measured value of mass flow or flow velocity based on the ascertained sound velocity values and/or the frequency dependent, ascertained damping values of the acoustic signal and/or the ascertained absorption values of the optical signal and/or the florescence values of the medium.

Since the velocity of sound and/or the frequency dependent damping are proportional to the thermal conductivity of the medium or the density of the medium, a correction of the measured values can be performed, for example, even in the case of media of unknown thermal conductivity or in the case of a medium composed of a number of components, for example, a gas mixture, especially a biogas.

Similar corrections can be made based on the absorption and the fluorescence of the medium.

It is advantageous when the apparatus for ascertaining a first measured value of flow velocity and/or mass flow of the medium by thermal, mass flow measurement and the apparatus for ascertaining the velocity of sound are arranged in one housing. This can occur in an extremely compact construction, such as shown in FIGS. 2a-e and FIG. 3. Extra securement apparatuses for installation of further devices do not have to be provided on the inner wall of the measuring tube.

Alternatively to the aforementioned variant, the apparatus for ascertaining the velocity of sound can be part of an apparatus for ascertaining the flow velocity of the medium based on the travel-time difference method. This means that an ultrasonic flow measurement device is supplementally arranged in the measuring tube. This can contribute to an increasing of the measuring range of the total flow measuring device.

Alternatively to the aforementioned embodiment variants, the apparatus for ascertaining the velocity of sound can also be embodied as a clamp-on sensor, so that a retrofitting, respectively remodeling, of an established thermal, mass flow measuring device is possible during operation and without removal of an already installed thermal, mass flow measuring device.

In order to enable an ascertaining of the composition of a gas mixture, it is advantageous when the flow measuring device additionally has an apparatus for ascertaining the pressure of the medium located in the measuring tube.

Humidity, for example of a gas, can be ascertained advantageously by the flow measuring device, to the extent that the flow measuring device further has an apparatus for ascertaining the electrical capacitance of the medium located in the measuring tube.

Figure 3:
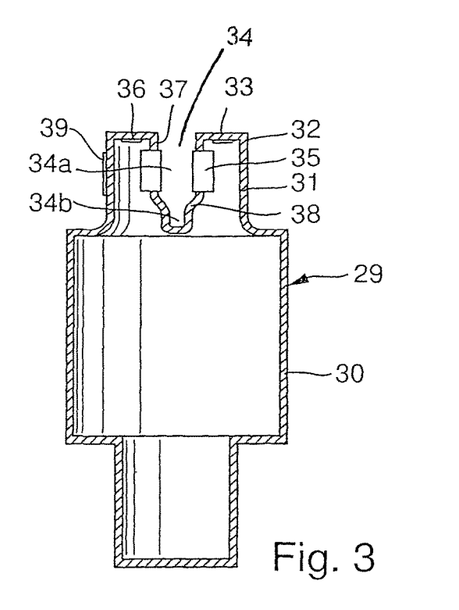
FIG. 3 is a schematic representation of a second sensor element of the first flow measuring device of the invention.

Of course, also the apparatus for ascertaining the pressure and/or the apparatus for ascertaining the electrical capacitance can be implemented in a single housing in compact construction, this being evident, among other things, also from FIG. 3.

The evaluation unit can supplementally also advantageously perform an ascertaining of the thermal conductivity, the density, the moisture content and/or the composition of the medium based on the ascertained sound velocity values, the frequency dependent, ascertained damping values of the acoustic signal, the pressure and/or the electrical capacitance of the medium located in the measuring tube.

An advantageous, space saving, and also minimally invasive (since only one hole must be drilled into the tube, or pipe, wall) variant of the arrangement of the apparatus for ascertaining the velocity of sound is the embodiment as an ultrasonic barrier in a sensor housing together with the thermal, flow measuring device.

According to the invention, a method for ascertaining a corrected measured value of flow velocity and/or mass flow of a medium in a measuring tube of a flow measuring device, especially a flow measuring device, includes steps as follows:
a) ascertaining the flow velocity and/or mass flow of the medium by thermal, mass flow measurement;
b) ascertaining velocity of sound and/or frequency dependent damping of an acoustic signal, especially an ultrasonic signal, in the medium and/or ascertaining a wavelength dependent absorption of an optical signal and/or excited fluorescence of the medium; and
c) correcting the ascertained mass flow or the ascertained flow velocity based on ascertained sound velocity values and/or frequency dependent, ascertained damping values of the acoustic signal and/or the ascertained absorption values of the optical signal and/or the florescence values of the medium.

Especially advantageous is the registering and correcting of measured values in real time or at least in an as short as possible time interval. This advantage can especially be utilized in the case of measuring gas mixtures of continually changing composition. Typical examples for this are, among others, biogas and the so-called shale gas. A corresponding correction is enabled, to the extent that an ascertaining of the velocity of sound and/or frequency dependent damping of an acoustic signal occurs in a measuring interval of preferably between 10 ms to 5 min, preferably 20 ms to 30 sec, especially preferably 100 ms to 5 sec.

Alternatively, also a continuous correction can be performed based on the velocity of sound via corresponding measurements with continuous wave ultrasound (CW) and measuring of phase.

Advantageously, the correcting of the velocity of sound and/or frequency dependent damping of an acoustic signal can occur by ascertaining a sound velocity- and/or damping dependent correction value, based on which a currently ascertained value of mass flow or flow velocity is corrected.

An advantageous use of the aforementioned flow measuring device or of the aforementioned method for determining the flow velocity and/or mass flow is in the field of gases or gas mixtures.

Especially, the aforementioned flow measuring device or the aforementioned method can advantageously serve for determining the composition and/or moisture content of gas mixtures.

BRIEF DESCRIPTION OF THE DRAWINGS

Examples of embodiments of the invention will now be explained in greater detail based on the appended drawing, the figures of which show as follows.

DETAILED DISCUSSION IN CONJUNCTION WITH THE DRAWINGS

Figure 1:
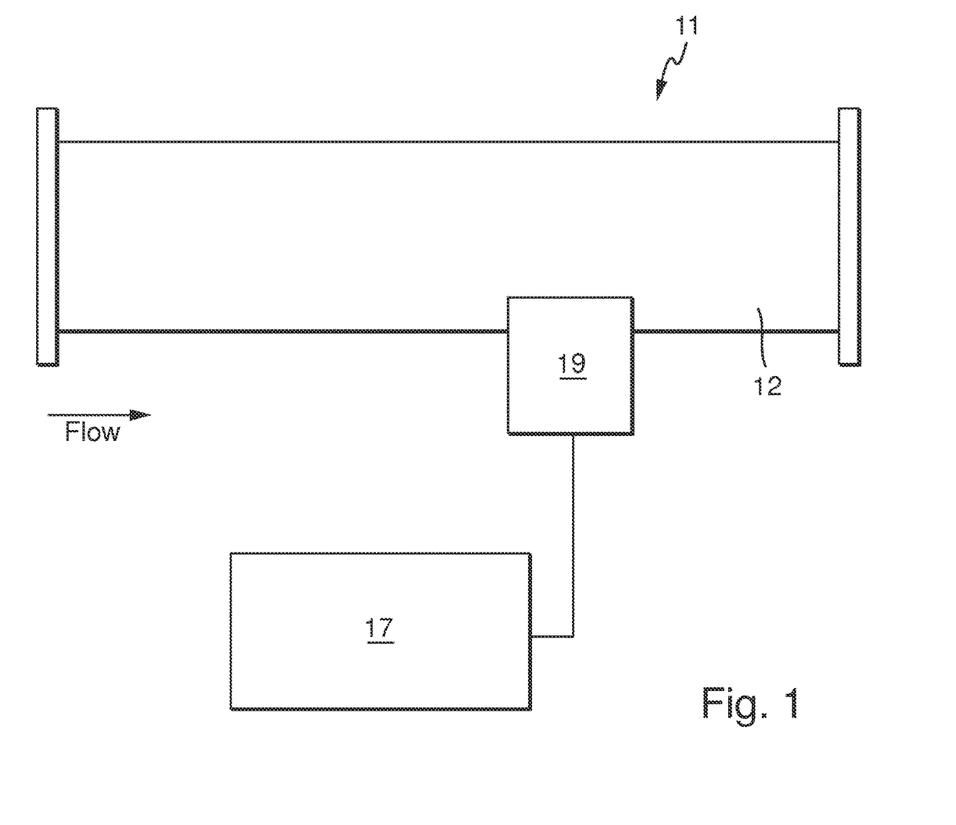
FIG. 1 is a schematic representation of the construction of a first flow measuring device of the invention.

FIG. 1 shows a schematic representation of a flow measuring device 11, which includes a measuring tube 12, a sensor element 19 and an evaluation unit 17. In such case, a medium flows through the measuring tube 12 in a flow direction A.

Sensor element 19 comprises an apparatus for ascertaining a first measured value of flow velocity and/or mass flow of the medium by thermal, mass flow measurement, as well as an apparatus for ascertaining the velocity of sound and/or frequency dependent damping of an acoustic signal, especially an ultrasonic signal. The evaluation unit enables the correcting of the ascertained first measured value of mass flow or flow velocity based on the ascertained sound velocity values and/or the frequency dependent, ascertained damping values of the acoustic signal, so that a corrected measured value is ascertained.

The measuring principle for ascertaining the thermal, mass flow by means of a thermal, flow measuring device is already known and will now be given a short discussion as follows:

Conventional thermal, flow measuring devices use usually two temperature sensors, which are arranged in, most often, pin-shaped, metal sleeves, so-called stingers. The sensors are in thermal contact with the medium flowing through a measuring tube or through the pipeline and are embodied as equally as possible.

For industrial use, the two temperature sensors are usually installed in a measuring tube. The temperature sensors can, however, also be mounted directly in the pipeline. One of the two temperature sensors is a so-called active temperature sensor, which is heated by means of a heating unit. The heating unit is either a supplemental resistance heater, or the temperature sensor is itself the heating unit in the form of a resistance element, e.g. an RTD (Resistance Temperature Device) sensor, which heats by conversion of electrical power, e.g. by a corresponding variation of the measuring electrical current. The second temperature sensor is a so-called passive temperature sensor: It measures the temperature of the medium.

Usually, in a thermal, flow measuring device, the heatable temperature sensor is so heated that a fixed temperature difference is set between the two temperature sensors. Alternatively, it is also known to supply a constant heating power via a control unit. If there is no flow in the measuring tube, then a time constant amount of heat is required for maintaining the predetermined temperature difference. If, in contrast, the medium to be measured is moving, the cooling of the heated temperature sensor is essentially dependent on the mass flow of the medium flowing past. Since the medium is colder than the heated temperature sensor, the flowing medium transports heat away from the heated temperature sensor. In order thus in the case of a flowing medium to maintain the fixed temperature difference between the two temperature sensors, an increased heating power is required for the heated temperature sensor.

The increased heating power is a measure for the mass flow, i.e. the mass flow of the medium through the pipeline. If, in contrast, a constant heating power is fed in, then the temperature difference between the two temperature sensors lessens as a result of the flow of the medium. The particular temperature difference is then a measure for the mass flow of the medium through the pipeline, respectively through the measuring tube. There is, thus, a functional relationship between the heating energy needed for heating the temperature sensor and the mass flow through a pipeline, respectively through a measuring tube. The dependence of the so-called heat transfer coefficient on the mass flow of the medium through the measuring tube, respectively through the pipeline, is utilized in thermal, flow measuring devices for determining the mass flow. Devices, which operate according to this principle, are manufactured and sold by applicant under the marks, 't-switch', 't-trend' and 't-mass'.

Figure 2A:
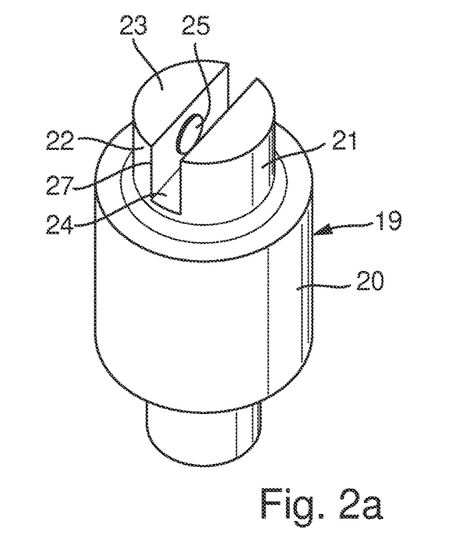
FIG. 2*a*-2*e* are views of a first sensor element of the first flow measuring device of the invention.
Figure 2B:
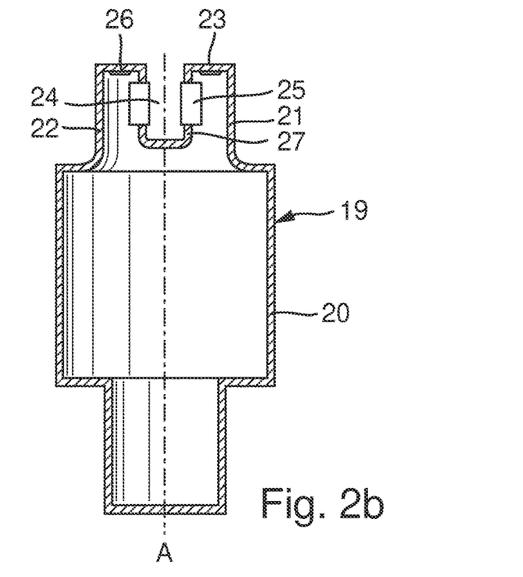
Figure 2C:
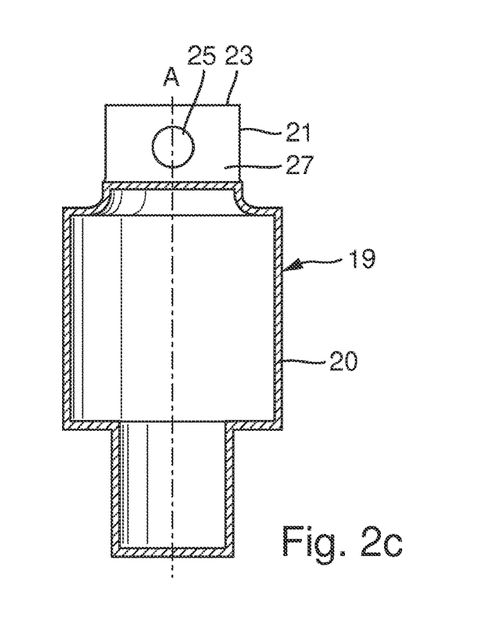
Figure 2D:
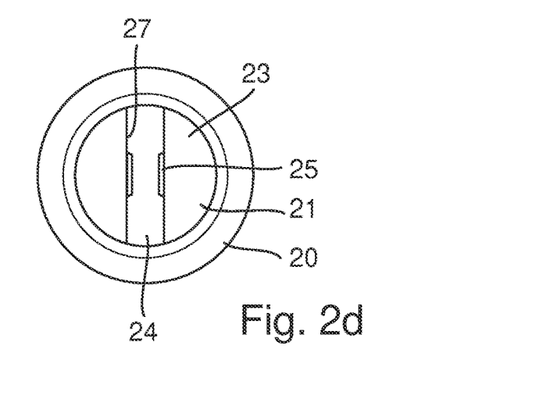
Figure 2E:
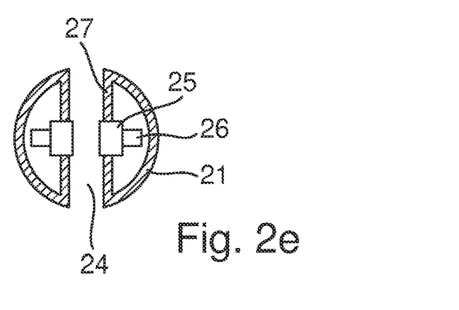

An example of an embodiment of a sensor element of the flow measuring device of the invention will now be explained in greater detail based on FIGS. 2*a*-2*e*. In such case, FIG. 2*a* is a perspective view, FIG. 2*b* is a front, sectional view, FIG. 2*c* is a lateral, sectional view, FIG. 2*d* is a plan view and FIG. 2*e* is a sectioned, bottom view.

Sensor element 19 includes a cylindrical sensor body 20 and a medium contacting, sensor head 21. Not shown are, among other things, signal paths at individual elements of the sensor head 21.

Sensor element 19 comprises a housing, in which are arranged the apparatus for ascertaining the flow velocity and/or mass flow of the medium by thermal, mass flow measurement and the apparatus for ascertaining the velocity of sound and/or frequency dependent damping of the ultrasonic signal.

The medium contacting sensor head 31 includes a cylindrical basic form, which is penetrated by a recess 34, which includes portions 34a and 34b, so that the sensor head 31 is, thus, divided into two semi-cylinder halves having, in each case, a lateral surface 32 in the arc shaped region of each semi-cylinder half and a planar surface element 37, which extends parallel to the longitudinal axis A of the sensor element 39.

Installed on the two oppositely lying surface elements 27 of the two semi-cylinder halves are an ultrasonic receiver and an ultrasonic transmitter, which form together an ultrasonic barrier 25. Alternatively or supplementally to the ultrasonic barrier, a light barrier can be provided, to the extent that optical, wavelength dependent absorption and/or excited fluorescence of the medium is to be ascertained.

The mentioned two semi-cylinder halves have additionally, in each case, an end face 23. In this way, there occurs a better thermal decoupling of the two thin-film resistance elements compared with an embodiment without the recess 25. The heat emission of the thermal, mass flow device to the medium occurs, in such case, essentially, thus by more than 50%, via these two end faces, which can be embodied flat or inclined in, or counter to, the flow direction. For this, an active temperature sensor and a passive temperature sensor 26 are arranged below the end faces 23. The operation of these temperature sensors has already been described above and is also sufficiently well known to those skilled in the art.

FIG. 3 shows a sensor element 29 with a construction similar to that of FIG. 2. Sensor element 29 has likewise a cylindrical sensor body 30 and a medium contacting sensor head 31. Not shown are, among other things, signal paths to individual elements of the sensor head 31.

Sensor element 29 includes a housing, in which are arranged the apparatus for ascertaining flow velocity and/or mass flow of the medium by thermal, mass flow measurement, thus the thermal, mass flow measuring device, and the apparatus for ascertaining the velocity of sound and/or frequency dependent damping of the ultrasonic signal, thus the ultrasonic barrier.

The medium contacting sensor head 31 includes a cylindrical basic form, which is penetrated by a recess 34, so that the sensor head 31 is, thus, divided into two semi-cylinder halves having, in each case, a lateral surface 32 in the arc shaped region of each semi-cylinder half and a planar surface element 37, which extends parallel to the longitudinal axis A of the sensor element 39.

Installed on two oppositely lying surface elements 37 of the two semi-cylinder halves are an ultrasonic receiver and an ultrasonic transmitter, which form an ultrasonic barrier 35. Beneath this ultrasonic barrier, the surface elements run toward one another. In these mutually approaching regions, on the oppositely lying sides of the surface elements, in each case, a capacitor plate can be arranged, in order to form a capacitor 38. In this way, among other things, the humidity of gases or gas mixtures can be ascertained.

The two semi-cylinder halves have additionally, in each case, an end face 33. Arranged below the end faces 33 are an active temperature sensor and a passive temperature sensor 36. The operation such temperature sensors has been described above and is also sufficiently known to those skilled in the art.

A micromechanical pressure sensor is arranged on the lateral surface in order to enable a pressure measurement.

An apparatus for ascertaining a first measured value of flow velocity and/or mass flow of the medium by thermal, mass flow measurement is, in the concrete case of FIGS. 1-4, either of the flow measuring devices 1 and 11, which are embodied as thermal, mass flow measuring devices.

Figure 4:
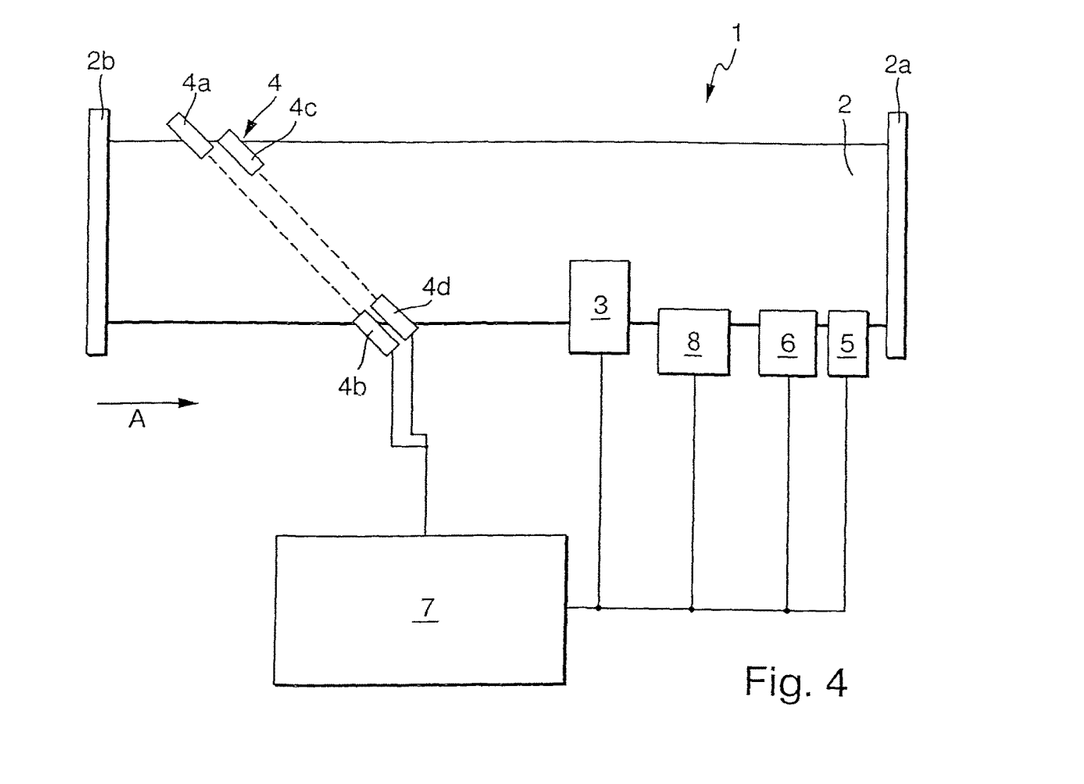
FIG. 4 is a schematic representation of the construction of a second flow measuring device of the invention.

An apparatus for ascertaining the velocity of sound and/or frequency dependent damping of an acoustic signal, especially an ultrasonic signal, can, such as shown in FIG. 4, be, for example, an ultrasonic flow measurement device or, in essentially simpler construction, for example, an ultrasonic barrier.

An evaluation unit 7 or 17 enables the correcting of the ascertained first measured value of mass flow or flow velocity based on the ascertained sound velocity values and/or the frequency dependent, ascertained damping values of the acoustic signal, so that a corrected measured value can be ascertained.

Of course, the evaluation unit is not limited only to these functions but can undertake other functions as well.

FIG. 3 shows a flow measuring device, which combines two different measuring principles for determining the flow velocity of a medium. Thus, utilized, on the one hand, is an ultrasonic measurement according to the travel-time difference principle and, on the other hand, a thermal, mass flow measurement. The measuring principle of ultrasonic measurement according to the travel-time difference principle is already known and will be discussed first shortly as follows.

Ultrasonic, flow measuring devices and thermal, flow measuring devices are applied often in process and automation technology for detection of volume- and/or mass flow of a medium through a pipeline.

In the field of ultrasonic measurement there are, with reference to mounting options, two types of ultrasonic, flow measuring devices: Inline, ultrasonic, flow measuring devices, which are usually mounted into the pipeline via flanges, and clamp-on-flow measuring devices, which are applied externally on the pipeline and measure the volume-, respectively mass, flow through the tube, or pipe, wall—thus non-invasively. Clamp-on-flow measuring devices are described, for example, in European Patent, EP 0 686 255 B1, U.S. Pat. No. 4,484,478, German Patents, DE 43 35 369 C1, DE 298 03 911 U1, DE 4336370 C1 and U.S. Pat. No. 4,598,593. As regards the measuring methods, two principles can be distinguished: Flow measuring devices, which determine the flow via the travel-time difference between ultrasonic, measurement signals in the flow direction and counter to the flow direction, and flow measuring devices, which win the flow information from the Doppler shift of the ultrasonic, measurement signals. In the case of ultrasonic, measuring devices, which work according to the travel-time difference method, the ultrasonic, measurement signals are radiated at a predetermined angle via a coupling element into the pipeline, respectively from the pipeline, in which the medium is flowing. In such case, the ultrasonic sensors are usually so arranged that the travel sound paths are directed through the central region of the pipeline, respectively measuring tube. The ascertained measured value of flow reflects, thus, the average flow of the medium in the pipeline. An essential component an ultrasonic sensor, respectively ultrasonic transducer, is a piezoelectric element. The essential component of a piezoelectric element is a piezoceramic layer metallized in at least one portion. Especially, the piezoceramic layer is a film or a membrane. By applying an electrical exciter signal, the piezoceramic layer is caused to oscillate and radiates via a coupling element an ultrasonic, measurement signal with a defined signal form at an angle of incidence into the pipeline. The receiving of the ultrasonic, measurement signal after passing through the pipeline occurs in reverse manner.

FIG. 4 shows a measuring tube 2 of a flow measuring device 1, in which at least first and second sensors 3, 4 are arranged for determining the flow of a medium. The medium can be a gaseous, vaporous or liquid medium, wherein especially measurements of gaseous- or vaporous media have, so far, been limited to particular flow velocity ranges.

The measuring tube 2 includes terminally arranged flanges 2a and 2b and, moreover, pressure- and temperature sensors 5 and 6, which in FIG. 4 are arranged as spatially separated sensors but can, however, also be combined compactly into one housing.

The first sensor, respectively sensor arrangement, 3 arranged in the ultrasonic device is composed of two temperature sensors, which are arranged, for example, in pin-shaped or cylindrical, metal sleeves. In such case, one of the two temperature sensors is the active temperature sensor, which is heated by means of a heating unit. The active temperature sensor of the first sensor 3 can also be the heating unit, for example, when an RTD-sensor is used. The second temperature sensor of the first sensor 3 measures the temperature of the medium. The first and second temperature sensors can be dimensioned equally to one another or differently from one another.

The second sensor 4 determines the flow by transmitting an ultrasonic signal, preferably according to the travel-time difference method. In such case, there are arranged on or in the wall of the measuring tube ultrasonic transducers 4a, 4b, 4c and 4d, which are embodied either as an integrated solution, respectively inline variant, or as a clamp-on variant. Such a measuring principle for ascertaining a flow velocity is known, for example, from German Patent, DE 10 2005 047 790 A1 (U.S. Pat. No. 8,104,359, US 20100024570), the content of which is incorporated herein by reference.

The flow measuring device shown in FIG. 4 combines, thus, in compact manner, an ultrasonic, flow measuring device with a thermal, flow measuring device, whereby synergistic effects result relative to determining flow velocity using both measuring principles, as will now be explained in greater detail.

For a long time, for flow measurement of media, different measuring methods have been used, depending, among other things, on the respective flow velocities of the media. Problematic in such case is that in the range around flow velocities of about 15 m/s the applicability of the two methods is relatively limited.

This is true especially in the case of gases. Thus, for gases, there occurs, for example, in the case of the use of the per se known travel-time difference method, in increased measure, dispersion of the ultrasonic measurement signal, whereby the intensity of the measured signal is lessened or, in given cases, the measured signal can even no longer be detected. The higher the flow velocity of the gas, the greater is the dispersion of the signal, thus the deflection of the signal, in the flow direction. Therefore, the determining of the flow velocity of gases by means of the travel-time difference method is limited to gases with a flow velocity of, preferably, 0.05 to 15 m/s.

In the case of higher velocities of the medium of, preferably, greater than 15 m/s, especially preferably, 15-100 m/s, advantageous for the measuring is especially a sensor arrangement 3 of two temperature sensors, in order to enable a thermal determining of the flow. For this type of measuring, however, a reliable determining or specification of the thermal conductivity is necessary.

This can be ascertained in the case of gases based on the formula $$c = \sqrt{\frac{\gamma RT}{M}}$$

(ideal gas equation), wherein c is the velocity of sound, $\gamma$ is the specific heat capacity of the medium flowing in the measuring tube 2, R is the universal gas constant (R=8.3143 J/mol K), T is the absolute temperature in Kelvin and M is the molecular weight of the medium in kilogram. In the case of gas mixtures, the specific heat capacity is composed of individual terms for the specific heat capacities of the components. Also, the molecular weight of the gas mixture is calculated from individual terms for the molecular weights of the components. The method of calculating these values for the gas mixture is explained in greater detail in German Patent, DE 10 2006 030 964.2 of the applicant and its content is incorporated by reference herein.

Thus, the velocity of sound can still be determined, even though an ultrasonic measurement per se does not deliver reliable results for such, thus even in the case of flow velocities of the medium above 15 m/s. Additionally, in the case of media with unknown thermal conductivity, also the composition or the thermal conductivity can be ascertained based on the determining of the velocity of sound. This can occur especially preferably also just from a single ultrasonic transducer of the apparatus for ascertaining the flow velocity of the medium based on the travel-time difference method.

Alternatively, the determining of the velocity of sound can also occur via a sensor specifically designed for determining the velocity of sound (8).

Thus, the combination of ultrasonic, flow measuring device and thermal, flow measuring device enables the determining of flow velocity for gases with flow velocities above 15 m/s in the case of unknown thermal conductivity.

The pressure- and temperature sensors can deliver other results, for example, concerning the particular composition of the gas, such as is described in German Patent, DE 10 2006 030 964.2, the content of which is incorporated by reference herein.

In an evaluation unit 7, the incoming information is processed and a flow velocity, as well as, in given cases, a thermal conductivity and a composition of the measured gas ascertained from the incoming information.

The apparatus 4 for ascertaining the flow velocity of the medium based on the travel-time difference method, thus the ultrasonic, flow measuring device, can have for preferred avoiding of measurement fluctuations and for complete registering of a flow profile a multipath arrangement with at least four ultrasonic transducers 4a-4d. Multipath arrangements are known per se, but enable here a better determining of the flow velocity and the velocity of sound, thus having, for example, a positive effect on the determining of the thermal conductivity of a gas or gas mixture and permitting a better determining of the switching point between the ultrasonic flow measurement device and the thermal, mass flow device.

Alternatively, the ultrasonic, measuring device can also have an arrangement for multireflection of the ultrasonic beam in the case of at least two ultrasonic transducers, this being achievable by a mirror arrangement in the measuring tube. This alternative provides a cost effective variant compared with the multipath arrangement.

In the following, based on an example of an embodiment, the method for ascertaining the flow velocity of combustion gases at an oil transport installation with the flow measuring device will be explained in greater detail.

First, there occurs an ascertaining of a measured value of flow velocity of the combustion gas of the oil transport installation based on the travel-time difference method. In such case, for ascertaining the mass balance in the normal operation of the plant, it is important to determine the flow velocity as exactly as possible. At the same time, the signal strength of the ultrasonic signal is continuously measured.

If the plant switches over to emergency operation, there can be an increase in the gas emission and, thus, an increase in the flow velocity. At the same time, there is a sinking of the signal strength due to dispersion. If the signal strength sinks below a predetermined, desired value, then the flow measuring device switches to the apparatus for ascertaining the thermal, mass flow, which enables the determining of flow velocity also at higher flow velocities. At the same time, also the composition of the outflowing gas can be verified, since combustion in emergency operation is often incomplete.

During the determining of the flow velocity using thermal, mass flow, the ultrasonic flow measurement device continues to run, in order that signal strength can be continuously evaluated. If the flow velocity of the combustion gases sinks below the desired value, the ultrasonic measurement device resumes the determining of the flow velocity.

Alternatively or supplementally, also the signal to noise ratio can be utilized, wherein, in the case of exceeding the predetermined, desired value, there is a switching from the ultrasonic measurement device to the thermal, mass flow meter.

Alternatively or supplementally, also a comparison of the signal forms of the ultrasonic signals in the flow direction A and counter to the flow direction A can occur. To the extent that the signal forms correlate, the determining occurs based on the travel-time difference method. Through specification of a desired value for the maximum deviation of the signal forms from one another and the comparison of the measured signal forms, in the case of exceeding the desired value, likewise a switching to the thermal, mass flow meter can occur.

The invention claimed is:

1. A flow measuring device for ascertaining a corrected measured value of mass flow of a medium, in a measuring tube, comprising:
    an apparatus for ascertaining a first measured value of mass flow of the medium by thermal, mass flow measurement;
    an apparatus for ascertaining velocity of sound and/or frequency dependent damping of an ultrasonic signal, in the medium comprising an ultrasonic receiver and an ultrasonic transmitter; and
    an evaluation unit comprising a control unit for correcting the ascertained first measured value of mass flow based on the ascertained sound velocity values and/or the frequency dependent, ascertained damping values of the ultrasonic signal, wherein:
    said correction is based on a proportionality between velocity of sound and/or the frequency dependent damping and to the thermal conductivity of the medium or the density of the medium; and
    said apparatus for ascertaining the mass flow of the medium by thermal, mass flow measurement includes at least two temperature sensors,
    wherein at least one sensor is a heatable temperature sensor.

2. The flow measuring device as claimed in claim 1, wherein:
    said apparatus for ascertaining a first measured value of mass flow of the medium by thermal, mass flow measurement said apparatus for ascertaining the velocity of sound and/or the frequency dependent damping and/or an apparatus for ascertaining an optical, wavelength dependent absorption and/or excited fluorescence of the medium the ascertained optical properties of the optical signal are arranged in one housing.

3. The flow measuring device as claimed in claim 2, wherein:
    said housing with said apparatus for ascertaining the mass flow of the medium by thermal, mass flow measurement and said apparatus for ascertaining the velocity of sound and/or frequency dependent damping of the ultrasonic signal is embodied as a sensor element; and
    said apparatus for ascertaining the velocity of sound and/or frequency dependent damping of the ultrasonic signal is embodied as an ultrasonic barrier.

4. The flow measuring device as claimed in claim 2, wherein:
    said housing with said apparatus for ascertaining the mass flow of the medium by thermal, mass flow measurement and said apparatus for ascertaining the velocity of sound and/or frequency dependent damping of the ultrasonic signal and/or with said apparatus for ascertaining an optical, wavelength dependent absorption and/or excited fluorescence of the medium in the form of a light barrier is embodied as a sensor element with a longitudinal axis and comprises a medium contacting, sensor head, which sensor head has a lateral surface, which extends parallel to the longitudinal axis of said sensor element, and an end face, which extends perpendicular to the longitudinal axis of said sensor element.

5. The flow measuring device as claimed in claim 2, wherein:
    said evaluation unit is supplementally provided for ascertaining thermal conductivity, density, moisture content, temperature, the ascertained optical properties of the medium, the pressure and/or the electrical capacitance of the medium located in the measuring tube.

6. The flow measuring device as claimed in claim 2, wherein:
    said housing with said apparatus for ascertaining mass flow of the medium by thermal, mass flow measurement and said apparatus for ascertaining an optical, wavelength dependent absorption and/or excited fluorescence of the medium,
    wherein said apparatus for ascertaining optical, wavelength dependent absorption and/or excited fluorescence of the medium is embodied as a light barrier.

7. The flow measuring device as claimed in claim 2, wherein:
    said housing with said apparatus for ascertaining the flow velocity and/or
    mass flow of the medium by thermal, mass flow measurement and
    said apparatus for ascertaining an optical, wavelength dependent absorption and/or excited fluorescence of the medium in the form of a light barrier is embodied as a sensor element with a longitudinal axis and comprises a medium contacting, sensor head, which sensor head has a lateral surface, which extends parallel to the longitudinal axis of said sensor element, and an end face, which extends perpendicular to the longitudinal axis of said sensor element.

8. A method for ascertaining a corrected measured value of a mass flow of a medium in a measuring tube of a flow measuring device as claimed in claim 2, comprising the steps of: ascertaining the mass flow of the medium by thermal, mass flow measurement;
ascertaining a wavelength dependent absorption of an optical signal and/or excited fluorescence of the medium; and
correcting the ascertained mass flow or the ascertained flow velocity based on the ascertained absorption values of the optical signal and/or the florescence values of the medium.

9. The flow measuring device as claimed in claim 1, wherein:
said apparatus for ascertaining the velocity of sound and/or the frequency dependent damping is part of an apparatus for ascertaining the of the medium based on the travel-time difference method.

10. The flow measuring device as claimed in claim 1, wherein:
said apparatus for ascertaining the velocity of sound and/or the frequency dependent damping is embodied as a clamp-on sensor.

11. The flow measuring device as claimed in claim 1, further comprises:
an apparatus for ascertaining pressure of the medium located in the measuring tube comprising a micromechanical pressure sensor.

12. The flow measuring device as claimed in claim 1, further comprising:
an apparatus for ascertaining electrical capacitance of the medium comprising a capacitor located in the measuring tube.

13. The flow measuring device as claimed in claim 1, wherein:
said evaluation unit is supplementally provided for ascertaining thermal conductivity, density, moisture content, temperature and/or composition of the medium based on the ascertained sound velocity values, the frequency dependent, ascertained damping values of the ultrasonic signal, the pressure and/or the electrical capacitance of the medium located in the measuring tube.

14. The flow measuring device as claimed in claim 1, wherein:
said apparatus for ascertaining the mass flow of the medium by thermal, mass flow measurement includes at least two thin film, resistance elements, with at least one heatable, thin film, resistance element, which are arranged in such a manner that heat input through one of the thin film-resistance elements in the medium occurs mainly on an end surface segment.

15. A method for ascertaining a corrected measured value of a flow velocity and/or a mass flow of a medium in a measuring tube of a flow measuring device as claimed in claim 1, comprising the steps of:
ascertaining the mass flow of the medium by thermal, mass flow measurement;
ascertaining velocity of sound and/or frequency dependent damping of an ultrasonic signal, in the medium and/or ascertaining a wavelength dependent absorption of an optical signal and/or excited fluorescence of the medium; and
correcting the ascertained mass flow or the ascertained flow velocity based on said ascertained sound velocity values and/or the frequency dependent.

16. The method as claimed in claim 15, wherein:
said ascertaining of the velocity of sound and/or frequency dependent damping of the ultrasonic signal occurs in a measuring interval from between 10 ms to 5 min.

17. The method as claimed in claim 16, wherein:
said ascertaining of the velocity of sound and/or frequency dependent damping of the ultrasonic signal occurs in a measuring interval from between 20 ms to 30 sec.

18. The method as claimed in claim 16, wherein:
said ascertaining of the velocity of sound and/or frequency dependent damping of the ultrasonic signal occurs in a measuring interval from between 100 ms to 5 sec.

19. The method as claimed in claim 15, wherein:
the ascertaining of the velocity of sound and/or frequency dependent damping of the ultrasonic signal is performed by a continuous correction via corresponding measurements with continuous wave ultrasound and measuring of phase and amplitude.

20. The method as claimed in claim 15, wherein:
the correcting of the ascertained mass flow or the ascertained flow velocity occurs by ascertaining a sound velocity- and/or damping dependent and/or ascertained optical property dependent, correction value, based on which a currently ascertained value of a mass flow or a flow velocity is corrected.

21. The method as claimed in claim 15, wherein a mass flow of a gas or a gas mixture is determined.

22. The method as claimed in claim 21, wherein:
the correcting of the ascertained mass flow or the ascertained flow velocity occurs by optical property dependent, correction value, based on which a currently ascertained value of a mass flow or a flow velocity is corrected.

23. The method as claimed in claim 15, wherein a composition and/or moisture content of a gas mixture is determined.

24. A method of using the flow measuring device as claimed in claim 1, comprising:
providing said flow measuring device in a gas or a gas mixture, and
determining a mass flow of said gas or gas mixture with said flow measuring device.

25. A method of using the flow measuring as claimed in claim 1, comprising:
providing said flow measuring device in a gas mixture, and
determining a composition and/or moisture content of said gas mixture with said flow measuring device.

26. The flow measuring device as claimed in claim 1, wherein said medium is a gas.

27. A flow measuring device for ascertaining a corrected measured value a corrected mass flow of a medium in a measuring tube, comprising:
an apparatus for ascertaining a first measured value of mass flow of the medium by thermal mass flow measurement;

an apparatus for ascertaining an optical, wavelength dependent absorption and/or excited fluorescence of the medium; and an evaluation unit comprising a control unit for correcting the ascertained first measured value of mass flow or flow velocity based on the ascertained absorption values of the optical signal and/or the fluorescence values of the medium, wherein:

said correction is based on a proportionality between ascertained absorption values of the optical signal and/or the fluorescence values and to the thermal conductivity of the medium or the density of the medium; and said apparatus for ascertaining the mass flow of the medium by thermal, mass flow measurement includes at least two temperature sensors, wherein at least one sensor is a heatable temperature sensor.

* * * * *